United States Patent
Ogai

(10) Patent No.: US 9,055,045 B2
(45) Date of Patent: Jun. 9, 2015

(54) IMAGE PROVIDING DEVICE, IMAGE PROVIDING METHOD, IMAGE PROVIDING PROGRAM, AND COMPUTER-READABLE RECORDING MEDIUM STORING THE PROGRAM

(75) Inventor: Takia Ogai, Shiagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/877,967

(22) PCT Filed: Sep. 3, 2012

(86) PCT No.: PCT/JP2012/072348
§ 371 (c)(1),
(2), (4) Date: Apr. 5, 2013

(87) PCT Pub. No.: WO2013/099358
PCT Pub. Date: Jul. 4, 2013

(65) Prior Publication Data
US 2014/0337476 A1   Nov. 13, 2014

(30) Foreign Application Priority Data
Dec. 28, 2011  (JP) .................................. 2011-289374

(51) Int. Cl.
G06F 15/16 (2006.01)
H04L 29/08 (2006.01)
G06F 17/30 (2006.01)

(52) U.S. Cl.
CPC .......... H04L 67/06 (2013.01); G06F 17/30905 (2013.01); H04L 67/141 (2013.01)

(58) Field of Classification Search
USPC .................. 709/202, 203, 231, 247
See application file for complete search history.

(56) References Cited

U.S. PATENT DOCUMENTS

| | | | | |
|---|---|---|---|---|
| 7,730,398 | B2 * | 6/2010 | Klassen et al. | 715/255 |
| 2002/0196368 | A1 * | 12/2002 | Peterson | 348/584 |
| 2003/0051255 | A1 * | 3/2003 | Bulman et al. | 725/135 |
| 2003/0179193 | A1 * | 9/2003 | Adams, Jr. | 345/419 |
| 2003/0218607 | A1 * | 11/2003 | Baumberg | 345/419 |
| 2004/0085330 | A1 * | 5/2004 | Walker et al. | 345/630 |
| 2006/0203314 | A1 * | 9/2006 | Onishi | 358/540 |
| 2007/0139520 | A1 * | 6/2007 | Loce et al. | 348/60 |
| 2008/0100880 | A1 * | 5/2008 | Matsunoshita | 358/471 |

(Continued)

FOREIGN PATENT DOCUMENTS

JP   2010-277501 A   12/2010

OTHER PUBLICATIONS

English Translation of International Preliminary Report on Patentability dated Jul. 10, 2014 issued in Application No. PCT/JP2012/072348.

(Continued)

*Primary Examiner* — Michael Y Won
(74) *Attorney, Agent, or Firm* — Sughrue Mion, PLLC

(57) ABSTRACT

An image providing device includes a page information transmission unit that outputs a first page to be displayed on a client terminal and an image output unit that outputs images contained in the first page to the client terminal and then outputs a second composite image combining images, other than the images contained in the first page, of a plurality of images contained in a second page to the client terminal. This avoids that an image contained in common in the first page and the second page is redundantly output to the client terminal. This thus reduces the number of transfers of images.

11 Claims, 13 Drawing Sheets

(56) References Cited

U.S. PATENT DOCUMENTS

| | | |
|---|---|---|
| 2009/0074232 A1* | 3/2009 | Yamashita .................... 382/100 |
| 2010/0066762 A1* | 3/2010 | Yeh et al. ...................... 345/629 |
| 2010/0238363 A1* | 9/2010 | Okamoto ....................... 348/744 |
| 2010/0245341 A1* | 9/2010 | Tanaka .......................... 345/214 |
| 2011/0004623 A1 | 1/2011 | Sagara |
| 2011/0029899 A1* | 2/2011 | Fainberg et al. .............. 715/760 |
| 2011/0227951 A1* | 9/2011 | Kubo et al. ................... 345/667 |
| 2013/0036193 A1* | 2/2013 | Padmanabhan ............... 709/217 |
| 2013/0070111 A1* | 3/2013 | Ohtsuka ..................... 348/207.1 |

OTHER PUBLICATIONS

English Translation of International Preliminary Report on Patentability dated Jul. 10, 2014 issued in Application No. PCT/JP2012/083707.

International Search Report for PCT/JP2012/072348 dated Sep. 25, 2012.

* cited by examiner (a)

(b)

(c)

IMAGE PROVIDING DEVICE, IMAGE PROVIDING METHOD, IMAGE PROVIDING PROGRAM, AND COMPUTER-READABLE RECORDING MEDIUM STORING THE PROGRAM

CROSS REFERENCE TO RELATED APPLICATIONS

This application is a National Stage of International Application No. PCT/JP2012/072348 filed Sep. 3, 2012, claiming priority based on Japanese Patent Application No. 2011-289374 filed Dec. 28, 2011, the contents of all of which are incorporated herein by reference in their entirety.

TECHNICAL FIELD

The present invention relates to an image providing device, an image providing method, an image providing program, and a computer-readable recording medium storing the program.

BACKGROUND ART

When a request is sent from a client terminal to a server in order to acquire a web page to be displayed on the client terminal, an HTTP session for transmitting the content of the web page from the server to the client terminal is established between the server and the client terminal. Typically, in the case of displaying a web page that contains many images on a client terminal, it is necessary to establish one HTTP session for transfer of one image. Because the number of HTTP sessions that can be established at a time in the server is finite, if further transfer of an image is needed when the number of established HTTP sessions has reached its limit, the transfer of the image cannot be carried out until an available session is created.

In view of the foregoing, a technique called CSS Sprites is known as a technique to reduce the number of HTTP sessions required for image transfer. In this technique, a plurality of images contained in one web page are combined together into one composite image, and the composite image is transferred to a client terminal. Because the composite image is treated as one image file, the number of HTTP sessions required for transfer of the composite image is one. The client terminal that has acquired the composite image cuts each image out of the composite image based on information contained in CSS and displays those images at specified positions in the web page. For example, the following Patent Literature 1 discloses a technique to reduce the size of the composite image created for CSS sprites.

CITATION LIST

Patent Literature

PTL 1: Japanese Unexamined Patent Application Publication No. 2010-277501

SUMMARY OF INVENTION

Technical Problem

In the transfer and display of images using CSS sprites, in the case where one web page and another web page to be displayed after the one web page contain a common image, if one composite image is prepared for each web page in a server, the common image is contained in each composite image. In this case, the common image is transferred redundantly, resulting in a waste of network resources. Further, the redundant transfer of the common image causes an increase in session occupancy time, resulting in a delay in display processing. Furthermore, because the common image that is contained in the previously transferred composite image is not used for display of the other web page that is displayed subsequently, the common image that is acquired through transfer from the server needs to be used in the display of the other web page, and the display processing takes time.

Accordingly, an object of the present invention is to provide an image providing device, an image providing method, an image providing program, and a computer-readable recording medium storing the program that can reduce the total size of transferred images as well as reducing the number of transfers of images in a technique of displaying images on a web page by transfer and display of a composite image such as CSS sprites, for example.

Solution to Problem

To solve the above problem, an image providing device according to one embodiment of the present invention is an image providing device that provides images contained in a page to a client terminal, including a first page information output means for outputting first page information for displaying a first page containing at least one image and the image contained in the first page to the client terminal, an image output means for outputting a second composite image combining one or more images, other than the image contained in the first page, of a plurality of images contained in a second page to be displayed after the first page is displayed on the client terminal to the client terminal, and a second page information output means for outputting second page information containing display instruction information to display an image contained in the second page and contained in common in the first page based on the image output by the first page information output means and display an image contained in the second page and other than the image contained in the first page based on the second composite image output by the image output means.

An image providing method according to one embodiment of the present invention is an image providing method in an image providing device that provides images contained in a page to a client terminal, including a first page information output step of outputting a first page containing at least one image and the image contained in the first page to the client terminal, an image output step of outputting a second composite image combining one or more images, other than the image contained in the first page, of a plurality of images contained in a second page to be displayed after the first page is displayed on the client terminal to the client terminal, and a second page information output step of outputting second page information containing display instruction information to display an image contained in the second page and contained in common in the first page based on the image output in the first page information output step and display an image contained in the second page and other than the image contained in the first page based on the second composite image output in the image output step.

An image providing program according to one embodiment of the present invention is an image providing program causing a computer to function as an image providing device that provides images contained in a page to a client terminal, the program causing the computer to implement a first page information output function of outputting a first page containing at least one image and the image contained in the first page to the client terminal, an image output function of outputting a second composite image combining one or more images, other than the image contained in the first page, of a plurality of images contained in a second page to be displayed after the first page is displayed on the client terminal to the client terminal, and a second page information output function of outputting second page information containing display instruction information to display an image contained in the second page and contained in common in the first page based on the image output by the first page information output function and display an image contained in the second page and other than the image contained in the first page based on the second composite image output by the image output function.

A computer-readable recording medium according to one embodiment of the present invention is a computer-readable recording medium storing an image providing program causing a computer to function as an image providing device that provides images contained in a page to a client terminal, the image providing program causing the computer to implement a first page information output function of outputting a first page containing at least one image and the image contained in the first page to the client terminal, an image output function of outputting a second composite image combining one or more images, other than the image contained in the first page, of a plurality of images contained in a second page to be displayed after the first page is displayed on the client terminal to the client terminal, and a second page information output function of outputting second page information containing display instruction information to display an image contained in the second page and contained in common in the first page based on the image output by the first page information output function and display an image contained in the second page and other than the image contained in the first page based on the second composite image output by the image output function.

According to the above-described embodiments, the first page to be displayed on the client terminal and images contained in the first page are output to the client terminal, and then a second composite image combining images, other than the images contained in the first page, of a plurality of images contained in a second page is output to the client terminal. It is thereby avoided that an image contained in common in the first page and the second page is redundantly output to the client terminal. Accordingly, the number of transfers of images is reduced. Further, the total size of transferred images can be reduced.

In the image providing device according to another embodiment, the first page may contain a plurality of images, and the first page information output means may output a first composite image combining the plurality of images contained in the first page to the client terminal.

According to the above-described embodiment, the second composite image is composed of images other than the images contained in the first composite image combining the plurality of images contained in the first page. Thus, in the case where the first and second composite images are output for displaying the first and second pages, respectively, it is avoided that an image contained in common in the first page and the second page is redundantly output to the client terminal.

The image providing device according to another embodiment may further include a determination means for determining whether the image contained in the first page is accumulated in the client terminal in such a manner that it can be re-displayed based on a condition of a request from the client terminal, and the image output means may output the second composite image to the client terminal when the determination means determines that the image contained in the first page is accumulated in the client terminal in such a manner that it can be re-displayed, and outputs a third composite image combining the plurality of images contained in the second page, including an image contained both in the first page and the second page, to the client terminal when the determination means determines that the image contained in the first page is not accumulated in the client terminal in such a manner that it can be re-displayed.

According to the above-described embodiment, the second composite image is output to the client terminal when it is determined that the image contained in the first page is accumulated in the client terminal in such a manner that it can be re-displayed, and therefore it is appropriately avoided that an image contained in common in the first page and the second page is redundantly output to the client terminal. On the other hand, the third composite image including an image contained both in the first page and the second page is output to the client terminal when it is determined that the image contained in the first page is not accumulated in the client terminal in such a manner that it can be re-displayed, and therefore the second page can be reliably displayed on the client terminal.

In the image providing device according to another embodiment, the second page information output means may output the second page information containing information to display the second page on the client terminal, the second page information containing determination instruction information causing the client terminal to determine whether the image contained in the first page is accumulated in the client terminal, and the determination means may determine that the image contained in the first page is accumulated in the client terminal in such a manner that it can be re-displayed when a request for the second composite image based on determination in the client terminal in accordance with the determination instruction information is received, and determine that the image contained in the first page is not accumulated in the client terminal in such a manner that it can be re-displayed when a request for the third composite image is received.

In the image providing method according to another embodiment, the second page information output step may output the second page information containing information to display the second page on the client terminal, the second page information containing determination instruction information causing the client terminal to determine whether the image contained in the first page is accumulated in the client terminal, the image providing method may further include a determination step of determining that the image contained in the first page is accumulated in the client terminal in such a manner that it can be re-displayed when a request for the second composite image based on determination in the client terminal in accordance with the determination instruction information is received, and determining that the image contained in the first page is not accumulated in the client terminal in such a manner that it can be re-displayed when a request for a third composite image combining the plurality of images contained in the second page is received, and the image output step may output the second composite image to the client terminal when the determination step determines that the image contained in the first page is accumulated in the client terminal in such a manner that it can be re-displayed, and output the third composite image to the client terminal when the determination step determines that the image contained in the first page is not accumulated in the client terminal in such a manner that it can be re-displayed.

According to the above-described embodiment, the second page information containing the determination instruction information is transmitted to the client terminal. Based on the determination instruction information, it is determined whether the image contained in the first page is accumulated in the client terminal or not. When a request for the second composite image is received from the client terminal based on determination, it can be determined that the image contained in the first page is accumulated. The second composite image is thereby output to the client terminal, and therefore it is appropriately avoided that an image contained in common in the first page and the second page is redundantly output to the client terminal. On the other hand, when a request for the third composite image is received from the client terminal based on determination in the client terminal, it can be determined that the image contained in the first page is not accumulated. The third composite image that includes an image contained in common in the first page and the second page is thereby output to the client terminal, and therefore the second page can be reliably displayed on the client terminal.

In the image providing device according to another embodiment, the second page information output means may output the second page information containing request instruction information causing the client terminal to make a request containing determination information capable of identifying whether the image contained in the first page is accumulated in the client terminal in such a manner that it can be re-displayed to the client terminal, and the determination means may determine whether the image contained in the first page is accumulated in the client terminal in such a manner that it can be re-displayed based on the determination information contained in the request received from the client terminal in response to the request instruction information.

In the image providing method according to another embodiment, the second page information output step may output the second page information containing request instruction information causing the client terminal to make a request containing determination information capable of identifying whether the image contained in the first page is accumulated in the client terminal in such a manner that it can be re-displayed to the client terminal, the image providing method may further include a determination step of determining whether the image contained in the first page is accumulated in the client terminal in such a manner that it can be re-displayed based on the determination information contained in the request received from the client terminal in response to the request instruction information, and the image output step may output the second composite image to the client terminal when the determination step determines that the image contained in the first page is accumulated in the client terminal in such a manner that it can be re-displayed, and output a third composite image combining the plurality of images contained in the second page to the client terminal when the determination step determines that the image contained in the first page is not accumulated in the client terminal in such a manner that it can be re-displayed.

According to the above-described embodiment, it is determined whether the image contained in the first page is accumulated in the client terminal in such a manner that it can be re-displayed based on the determination information from the client terminal capable of identifying whether the image contained in the first page is accumulated in the client terminal in such a manner that it can be re-displayed. In this determination, when the image contained in the first page is accumulated in the client terminal, the second composite image is output to the client terminal, and therefore it is appropriately avoided that an image contained in common in the first page and the second page is redundantly output to the client terminal. On the other hand, when it is determined that the image contained in the first page is not accumulated in the client terminal, the third composite image that includes an image contained in common in the first page and the second page is output to the client terminal, and therefore the second page can be reliably displayed on the client terminal.

In the image providing device according to another embodiment, the second page information output means may output the second page information containing request instruction information causing the client terminal to make a request for the image contained in the first page to the image providing device when the image contained in the first page is not accumulated in the client terminal in such a manner that it can be re-displayed to the client terminal, and the determination means may determine that the image contained in the first page is accumulated in the client terminal in such a manner that it can be re-displayed when the request for the image contained in the first page from the client terminal based on the request instruction information is not received, and determine that the image contained in the first page is not accumulated in the client terminal in such a manner that it can be re-displayed when the request for the image contained in the first page from the client terminal based on the request instruction information is received.

In the image providing method according to another embodiment, the second page information output step may output the second page information containing request instruction information causing the client terminal to make a request for the image contained in the first page to the image providing device to the client terminal, the image providing method may further include a determination step of determining that the image contained in the first page is accumulated in the client terminal in such a manner that it can be re-displayed when the request for the image contained in the first page from the client terminal based on the request instruction information is not received, and determining that the image contained in the first page is not accumulated in the client terminal in such a manner that it can be re-displayed when the request for the image contained in the first page from the client terminal based on the request instruction information is received, and the image output step may output the second composite image to the client terminal when the determination step determines that the image contained in the first page is accumulated in the client terminal in such a manner that it can be re-displayed, and output a third composite image combining the plurality of images contained in the second page to the client terminal when the determination step determines that the image contained in the first page is not accumulated in the client terminal in such a manner that it can be re-displayed.

According to the above-described embodiment, the second page information containing the request instruction information is transmitted to the client terminal. Based on the request instruction information, when the image contained in the first page is not accumulated in the client terminal, a request for the image contained in the first page is made to the image providing device. When the image providing device does not receive a request for the image contained in the first page from the client terminal, it can be determined that the image contained in the first page is accumulated in the client terminal. The second composite image is thereby output to the client terminal, and therefore it is appropriately avoided that an image contained in common in the first page and the second page is redundantly output to the client terminal. On the other hand, when the image providing device receives a request for the image contained in the first page from the client terminal, it can be determined that the image contained in the first page is not accumulated in the client terminal. The third composite image that includes an image contained in common in the first page and the second page is thereby output to the client terminal, and therefore the second page can be reliably displayed on the client terminal.

In the image providing device according to another embodiment, the determination means may transmit header information containing information for identifying the image contained in the first page in response to the request for the first page from the client terminal based on the request instruction information, and determine whether the image contained in the first page is accumulated in the client terminal in such a manner that it can be re-displayed depending on whether a request for transmission of the image contained in the first page is received within a specified period of time from when the header information is transmitted.

According to the above-described embodiment, it can be appropriately determined whether the image contained in the first page is accumulated in the client terminal.

Advantageous Effects of Invention

According to the above present invention, it is possible to reduce the total size of transferred images as well as reducing the number of transfers of images in a technique of displaying images on a web page by transfer and display of a composite image such as CSS sprites, for example.

DESCRIPTION OF EMBODIMENTS

Embodiments of the present invention are described hereinafter in detail with reference to the appended drawings. In the description of the drawings, the same or equivalent elements are denoted by the same reference symbols, and the redundant explanation thereof is omitted.

Figure 1:
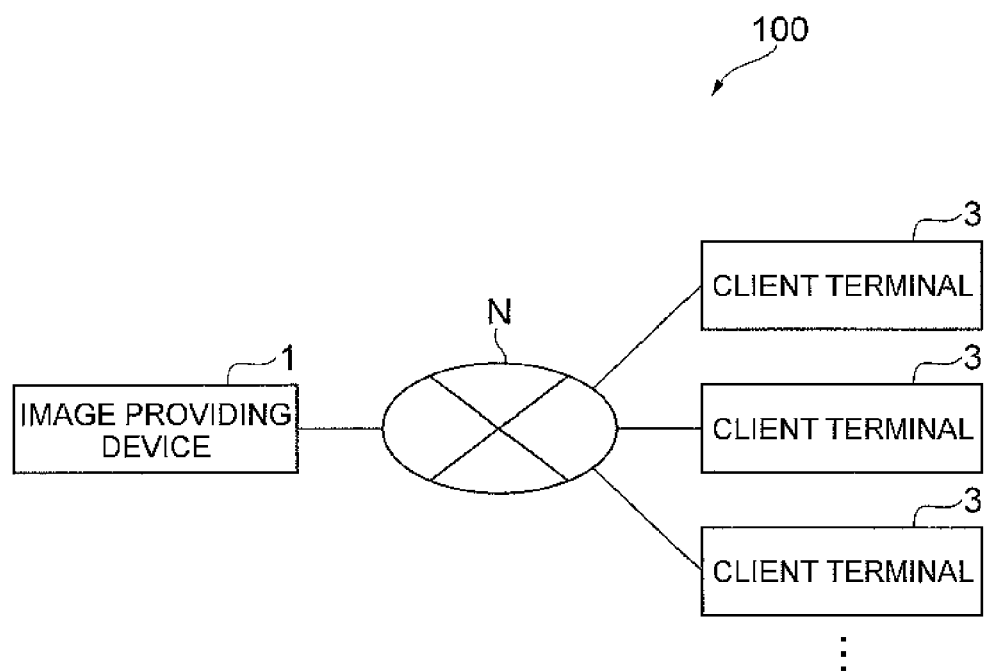
FIG. 1 is a diagram showing device components of a system including an image providing device.

FIG. 1 is a block diagram showing device components of a system 100 that includes an image providing device according to an embodiment. The system 100 includes an image providing device 1 and a plurality of client terminals 3. The image providing device 1 according to the embodiment is a device that provides images contained in a web page to the client terminal 3. To be specific, the image providing device 1 is a web server, for example. The image providing device 1 outputs page information for displaying a web page and images contained in the web page and the like to the client terminal in response to a request from the client terminal 3. The page information is HTML, for example.

The image providing device 1 and the client terminals 3 can communicate with one another through a communication network N that is the Internet, a wireless LAN, a mobile communication network or the like. The image providing device 1 is a server, for example. The client terminal 3 is a mobile terminal, a personal computer or the like, for example. Although three client terminal 3 are shown in FIG. 1, the number of client terminals 3 in the system 100 is arbitrary.

First Embodiment

Figure 2:
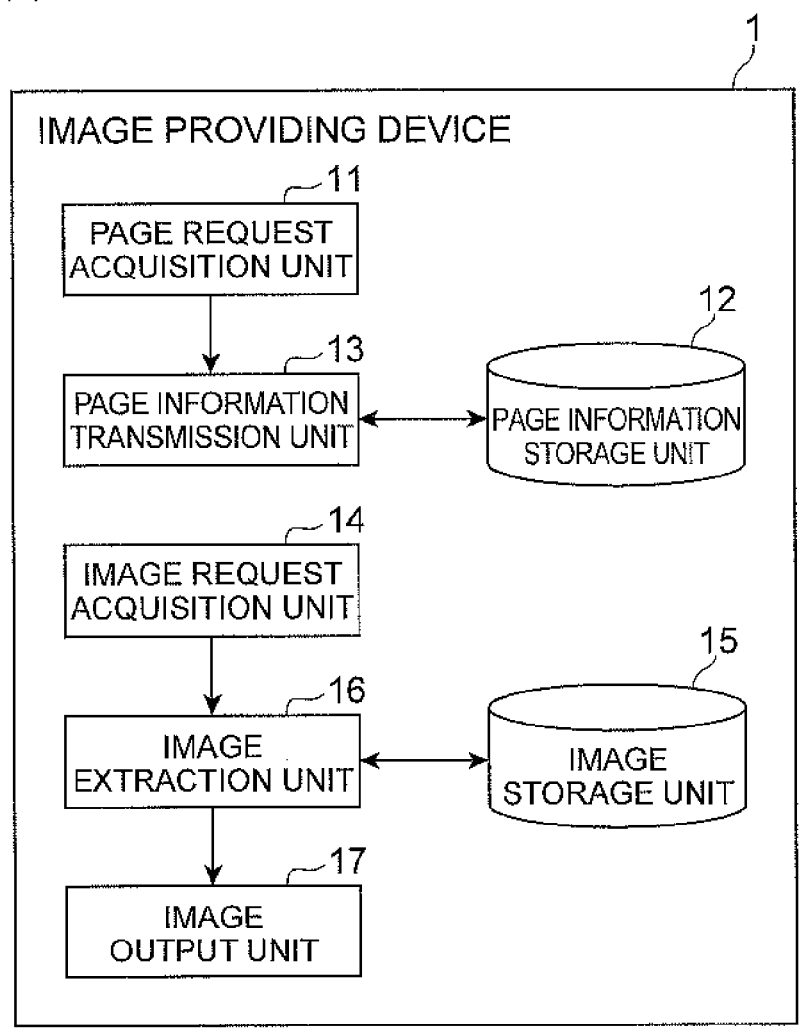
FIG. 2 is a block diagram showing a functional configuration of an image providing device according to a first embodiment.

FIG. 2 is a block diagram showing a functional configuration of the image providing device 1 according to the first embodiment. As shown in FIG. 2, the image providing device 1 includes, as functional components, a page request acquisition unit 11, a page information storage unit 12, a page information transmission unit 13 (first page information output means, second page information output means), an image request acquisition unit 14 (determination means), an image storage unit 15, an image extraction unit 16 (image output means), and an image output unit 17 (first page information output means, image output means). Note that, although the functional units 11 to 17 are incorporated in one device in this embodiment, the functional units 11 to 17 may be incorporated in separate devices that can communicate with one another. For example, the page information storage unit 12 and the image storage unit 15 may be included in another device that can communicate with the image providing device 1.

Figure 3:
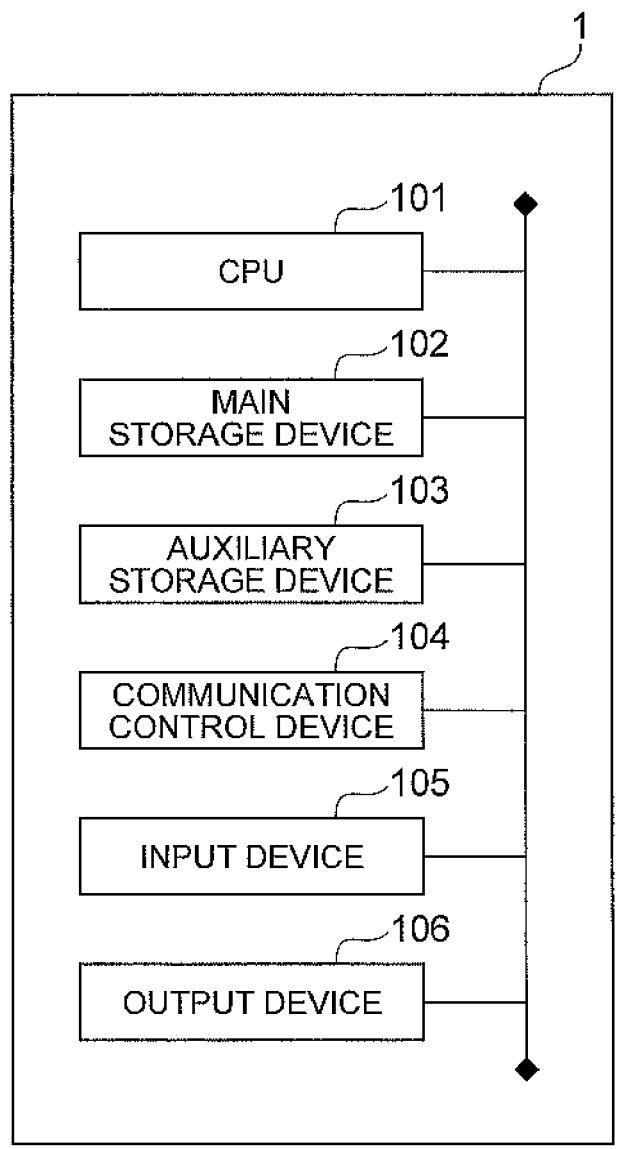
FIG. 3 is a diagram showing a hardware configuration of an image providing device.

FIG. 3 is a hardware configuration diagram of the image providing device 1. The image providing device 1 is physically configured as a computer system that includes a CPU 101, a main storage device 102 such as memory like RAM and ROM, an auxiliary storage device 103 such as a hard disk, a communication control device 104 such as a network card, an input device 105 such as a keyboard and a mouse, which is an input device, an output device 106 such as a display and the like.

The functions shown in FIG. 2 are implemented by loading given computer software (image providing program) onto hardware such as the CPU 101 or the main storage device 102 shown in FIG. 3, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

Figure 4:
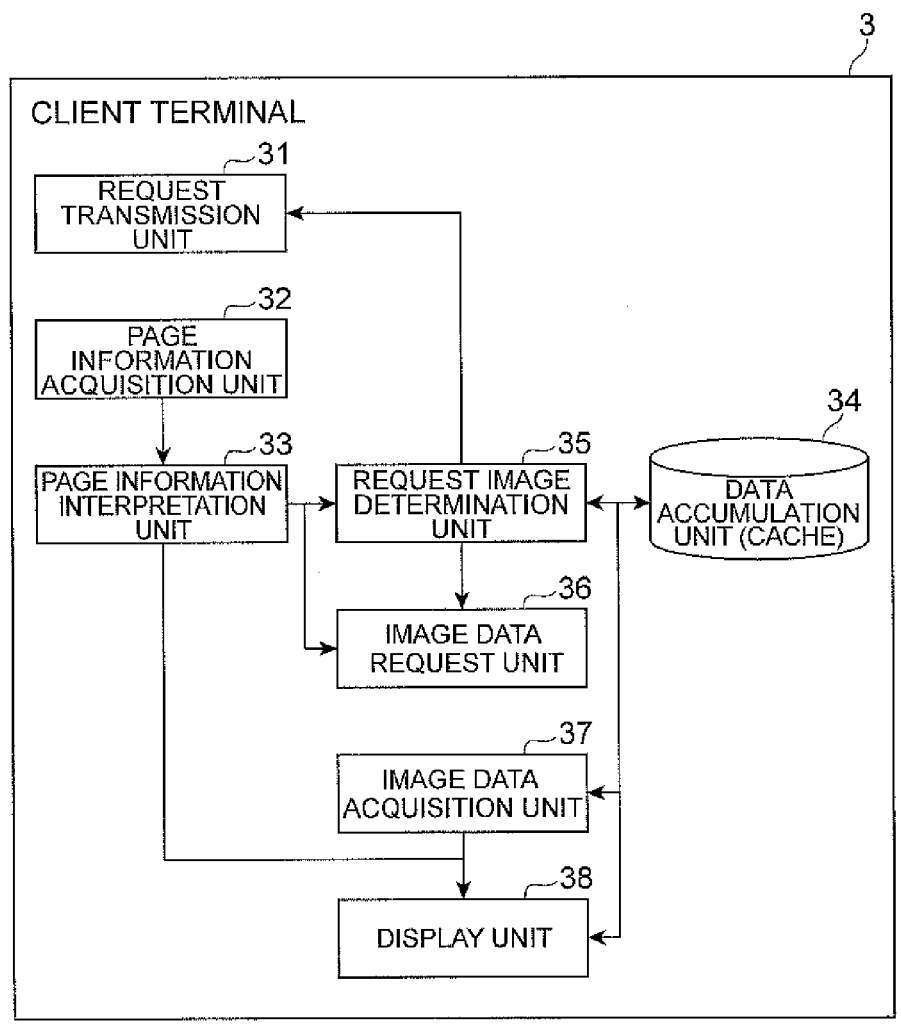
FIG. 4 is a block diagram showing a functional configuration of a client terminal according to the first embodiment.

FIG. 4 is a block diagram showing a functional configuration of the client terminal 3 according to the first embodiment. As shown in FIG. 4, the client terminal 3 includes, as functional components, a request transmission unit 31, a page information acquisition unit 32, a page information interpretation unit 33, a data accumulation unit 34, a request image determination unit 35, an image data request unit 36, an image data acquisition unit 37, and a display unit 38. Like the image providing device 1, the client terminal 3 is also configured as a computer system and has a hardware configuration as shown in FIG. 3. The respective functional units of the image providing device 1 are described hereinafter with reference back to FIG. 2.

The page request acquisition unit 11 is a part that receives a request for page information from the client terminal 3. The page information is information for displaying a web page on the client terminal 3 and it is represented by HTML, for example. In this embodiment, the page request acquisition unit 11 receives a request for first page information for displaying a first page and a request for second page information for displaying a second page that is displayed after displaying the first page on the client terminal 3. The page request acquisition unit 11 sends out the received request for page information to the page information transmission unit 13.

The page information storage unit 12 is a storage mans that stores page information. In this embodiment, the page information storage unit 12 stores the first page information and the second page information.

The page information transmission unit 13 is a part that outputs page information to the client terminal 3 in response to a request for page information acquired by the page request acquisition unit 11. In this embodiment, the page information transmission unit 13 outputs the first page information for displaying the first page to the client terminal 3. The first page is a web page that contains at least one image. The first page may contain a plurality of images. Further, the page information transmission unit 13 outputs the second page information for displaying the second page on the client terminal 3 to the client terminal 3.

Figure 5:
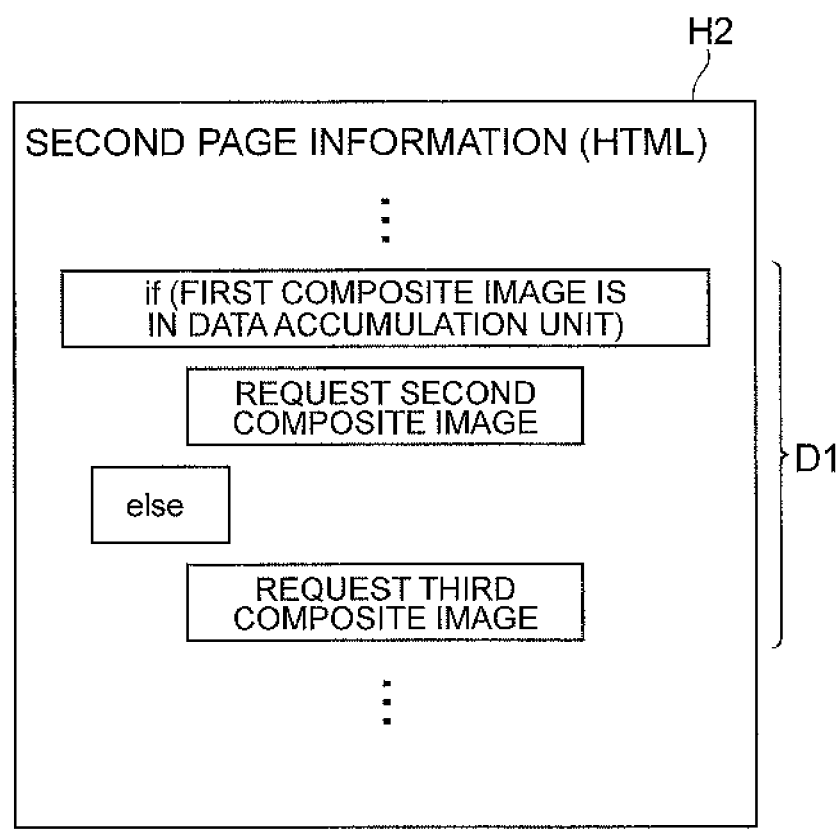
FIG. 5 is a diagram schematically showing second page information.

The second page information is information for displaying the second page that is displayed after the first page is displayed as described above, and it contains a determination instruction information for causing the client terminal 3 to determine whether images contained in the first page are accumulated in the client terminal 3. FIG. 5 is a diagram schematically showing the second page information. As shown in FIG. 5, the second page information H2 is represented by HTML or JavaScript (registered trademark; the same applies below), for example, and contains a determination instruction information D1. The determination instruction information D1 is represented by JavaScript, for example. The determination instruction information D1 first causes the client terminal 3 to determine whether a first composite image is accumulated in the data accumulation unit 34. When the first composite image is accumulated in the data accumulation unit 34, the determination instruction information D1 causes the client terminal 3 to request a second composite image to the image providing device 1. On the other hand, when the first composite image is not accumulated in the data accumulation unit 34, the determination instruction information D1 causes the client terminal 3 to request a third composite image to the image providing device 1.

Figure 6:
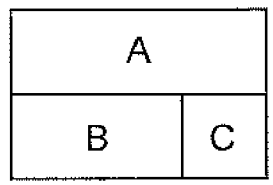
FIG. 6 is a diagram schematically showing first, second and third composite images.
Figure 6:
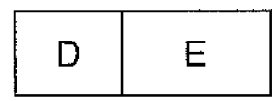
Figure 6:
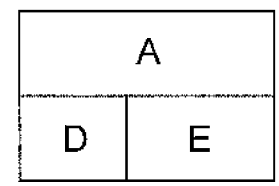

The first, second and third composite images are described hereinafter with reference to FIG. 6. FIGS. 6(a), 6(b) and 6(c) are diagrams schematically showing the first, second and third composite images, respectively. The composite image is crated for CSS sprites, and a plurality of images contained in one web page are combined together. In the example of this embodiment, the first page contains images A, B and C, and the second page contains images A, D and E.

As shown in FIG. 6(a), the first composite image is a composite image that is used for display of images in the first page, and it is composed of the images A, B and C. Further, the second and third composite images are composite images that are used for display of images in the second page. As shown in FIG. 6(b), the second composite image is a composite image that is created by combining the images D and E, which are images other than the image A contained in the first page. On the other hand, as shown in FIG. 6(c), the third composite image is a composite image that is created by combining the image A contained in the first page and the images D and E.

The image request acquisition unit 14 is a part that determines whether images contained in the first page are accumulated in the data accumulation unit 34 of the client terminal 3 in such a manner that they can be re-displayed based on the condition of the request from the client terminal 3. To be specific, the image request acquisition unit 14 determines that images contained in the first page are accumulated in the client terminal 3 in such a manner that they can be re-displayed when it receives a request for the second composite image on the basis of the determination in the client terminal in accordance with the determination instruction information 3.

Specifically, as described above with reference to FIG. 5, the client terminal 3 makes a request for the second composite image to the image providing device 1 when the first composite image is accumulated in the data accumulation unit 34 based on the determination instruction information D1 contained in the second page information H2. Receiving the request for the second composite image, the image request acquisition unit 14 can determine that images contained in the first page are accumulated in the client terminal 3 in such a manner that they can be re-displayed.

On the other hand, the image request acquisition unit 14 determines that images contained in the first page are not accumulated in the client terminal 3 in such a manner that they can be re-displayed when it receives a request for the third composite image.

Specifically, the client terminal 3 makes a request for the third composite image to the image providing device 1 when the first composite image is not accumulated in the data accumulation unit 34 based on the determination instruction information D1 contained in the second page information H2. Receiving the request for the third composite image, the image request acquisition unit 14 can determine that images contained in the first page are not accumulated in the client terminal 3 in such a manner that they can be re-displayed.

Further, the image request acquisition unit 14 can acquire a request for the first composite image for displaying images in the first page from the client terminal 3.

The image storage unit 15 is a part that stores images contained in a web page to be displayed on the client terminal 3. In this embodiment, the image storage unit 15 stores the first, second and third composite images (see FIG. 6). Note that the image storage unit 15 may further store non-composite images that are to be displayed without using a technique such as CSS sprites.

The image extraction unit 16 is a part that extracts a composite image from the image storage unit 15 in response to a request that is received by the image request acquisition unit 14.

In this embodiment, when the image request acquisition unit 14 determines that images contained in the first page are accumulated in the client terminal in such a manner that they can be re-displayed, the image extraction unit 16 extracts the second composite image from the image storage unit 15.

Specifically, when the image request acquisition unit 14 receives a request for the second composite image from the client terminal 3, the image extraction unit 16 extracts the second composite image from the image storage unit 15 in response to the request and sends it out to the image output unit 17.

On the other hand, when the image request acquisition unit 14 determines that images contained in the first page are not accumulated in the client terminal in such a manner that they can be re-displayed, the image extraction unit 16 extracts the third composite image from the image storage unit 15. Specifically, when the image request acquisition unit 14 receives a request for the third composite image from the client terminal 3, the image extraction unit 16 extracts the third composite image from the image storage unit 15 in response to the request and sends it out to the image output unit 17.

The image output unit 17 is a part that outputs the composite image sent from the image extraction unit 16 to the client terminal 3. Specifically, when it is determined that images contained in the first page are accumulated in the client terminal in such a manner that they can be re-displayed, the image output unit 17 outputs the second composite image to the client terminal 3. As a result, it is appropriately avoided that an image contained in common in the first page and the second page is redundantly output to the client terminal.

On the other hand, when it is determined that images contained in the first page are not accumulated in the client terminal in such a manner that they can be re-displayed, the image output unit 17 outputs the third composite image to the client terminal 3. As a result, all of the images required for display of the second page are output to the client terminal 3, and therefore the second page can be reliably displayed on the client terminal.

Note that, when the image request acquisition unit 14 receives a request for the first composite image, the image output unit 17 outputs the first composite image extracted by the image extraction unit 16 to the client terminal 3.

The respective functional units of the client terminal 3 are described hereinafter with reference to FIG. 4. The functions in the respective functional units of the client terminal 3 are implemented by normal functions incorporated in a web browser and interpretation and execution of the page information (HTML) from the image providing device 1.

The request transmission unit 31 is a part that transmits a request for HTML, which is page information for displaying a web page on the client terminal 3, to the image providing device 1. In this embodiment, the request transmission unit 31 transmits a request for the first page information for displaying the first page and the second page information for displaying the second page that is displayed after the first page is displayed to the image providing device 1. Further, the request transmission unit 31 outputs a request for CSS information for displaying the second page to the client terminal 3 in accordance with a determination result of the request image determination unit 35, which is described later. Furthermore, the request transmission unit 31 can output a request for CSS information for displaying the first page to the client terminal 3.

The page information acquisition unit 32 is a part that acquires the page information that is output from the image providing device 1. In this embodiment, the page information acquisition unit 32 acquires the first and second page information. The page information acquisition unit 32 sends out the acquired page information to the page information interpretation unit 33.

The page information interpretation unit 33 is a part that interprets and executes the content of the page information represented by HTML, for example. In this embodiment, the page information interpretation unit 33 interprets and executes the content of the first page information for displaying the first page. Further, when displaying the second page after displaying the first page, the page information interpretation unit 33 interprets and executes the content of the second page information. Further, the page information acquisition unit 32 can acquire CSS information for displaying the first and second pages.

The data accumulation unit 34 is a so-called cache and temporarily accumulates images or the like acquired for displaying a web page. In this embodiment, the data accumulation unit 34 can accumulate the first composite image that is acquired for displaying the first page, for example.

The request image determination unit 35 is a part that determines whether images contained in the first page are accumulated in the data accumulation unit 34 based on the determination instruction information D1 contained in the second page information H2. Specifically, the request image determination unit 35 determines whether an image contained in the second page and contained also in the first page is accumulated in the data accumulation unit 34. In this embodiment, the request image determination unit 35 determines whether the first composite image used for displaying the first page is accumulated in the data accumulation unit 34, as shown in FIG. 5. Then, the request image determination unit 35 sends out the determination result to the image data request unit 36.

The image data request unit 36 is a part that outputs a request for the second or third composite image to the image providing device 1 in accordance with the determination result of the request image determination unit 35. Specifically, when the first composite image is accumulated in the data accumulation unit 34, the image data request unit 36 outputs a request for the second composite image to the image providing device 1. On the other hand, when the first composite image is not accumulated in the data accumulation unit 34, the image data request unit 36 outputs a request for the third composite image to the image providing device 1.

The image data acquisition unit 37 is a part that acquires images that are output from the image providing device 1. In this embodiment, the image data acquisition unit 37 acquires a composite image from the image providing device 1. Note that the image data acquisition unit 37 may cache the acquired composite image or the like into the data accumulation unit 34. Whether the acquired composite image or the like is cached into the data accumulation unit 34 or not depends on setting for cache or the like in the client terminal 3. Accordingly, even when the image data acquisition unit 37 acquires the first composite image to be used for displaying the first page, for example, there is the case where the first composite image is accumulated in the data accumulation unit 34 and the case where it is not. Further, even when the first composite image is temporarily accumulated in the data accumulation unit 34, there is the case where the first composite image is deleted from the data accumulation unit 34 before the second page is displayed.

The display unit 38 is a part that displays a web page based on the page information in the page information interpretation unit 33, the composite image acquired by the image data acquisition unit 37 and the like.

Figure 7:
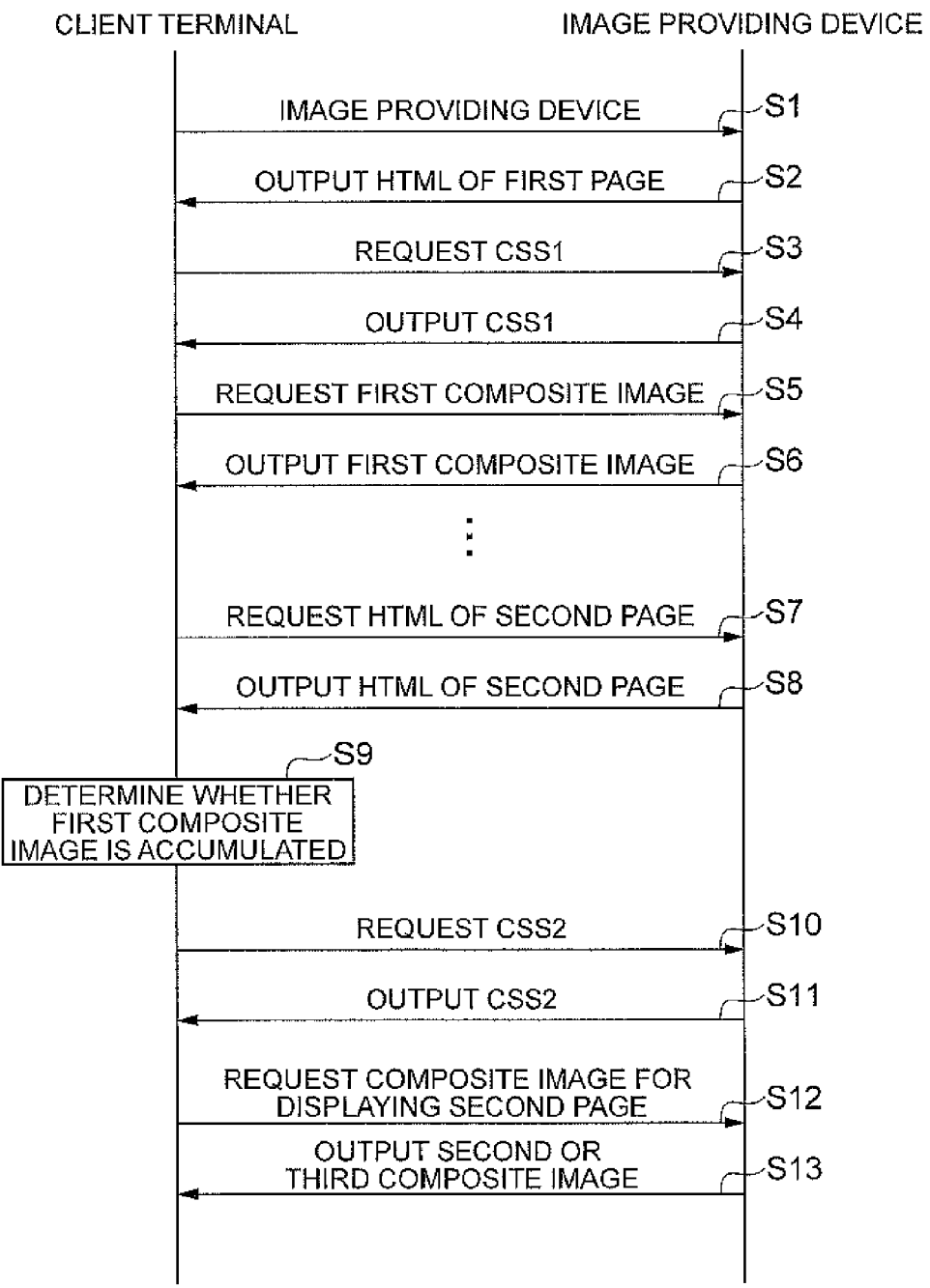
FIG. 7 is a timing chart showing a process in the image providing device according to the first embodiment.

The operation of the image providing device 1 according to this embodiment is described hereinafter with reference to FIG. 7. FIG. 7 is a timing chart showing an image providing process for the client terminal 3 in the image providing device 1.

First, the request transmission unit 31 of the client terminal 3 makes a request for HTML (first page information) for displaying the first page to the image providing device 1 (S1). When the page request acquisition unit 11 of the image providing device 1 acquires the request for the first page information, the page information transmission unit 13 outputs the first page information to the client terminal 3 (S2).

When the page information acquisition unit 32 of the client terminal 3 acquires the first page information, the request transmission unit 31 makes a request for acquisition of CSS1, which is CSS information for displaying the first page, to the image providing device 1 based on the interpretation of the first page information (S3). Specifically, the first page information contains description indicating that the CSS1 should be requested. Then, the page information transmission unit 13 of the image providing device 1 outputs the CSS1 to the client terminal 3 (S4). The CSS1 contains information for displaying images contained in the first page and further contains information indicating acquisition of the first composite image combining the images contained in the first page and information for cutting out each image from the first composite image and using them for display of the first page.

Next, the image data request unit 36 of the client terminal 3 makes a request for the first composite image to the image providing device 1 (S5). When the image request acquisition unit 14 of the image providing device 1 acquires the request for the first composite image, the image output unit 17 outputs the first composite image that is extracted from the image storage unit 15 by the image extraction unit 16 to the client terminal 3 (S6). By the above process, the first page is displayed on the client terminal 3. The first page may contain control information that causes transition to the second page. For example, when transition to the second page is instructed upon user operation or the like, the request transmission unit 31 of the client terminal 3 makes a request for HTML (second page information) for displaying the second page to the image providing device 1 (S7). When the page request acquisition unit 11 of the image providing device 1 acquires the request for the second page information H2, the page information transmission unit 13 outputs the second page information H2 to the client terminal 3 (S8).

Then, the request image determination unit 35 of the client terminal 3 determines whether the first composite image is accumulated in the data accumulation unit 34 based on the determination instruction information D1 contained in the second page information H2 (S9). To be specific, in this determination step, a header from the image providing device 1 in response to a request for the first composite image is analyzed, and whether the first composite image is accumulated in the data accumulation unit 34 or not is determined based on the analysis, for example.

After that, the request transmission unit 31 of the client terminal 3 outputs a request for CSS2, which is CSS information for displaying the second page, to the image providing device 1 in accordance with the determination result in Step S9 (S10). Specifically, when it is determined the first composite image is accumulated in the data accumulation unit 34, the request for CSS2 contains information indicating a request for the second composite image for displaying the second page. On the other hand, when it is determined the first composite image is not accumulated in the data accumulation unit 34, the request for CSS2 contains information indicating a request for the third composite image for displaying the second page. Note that, although a request for CSS2 in accordance with the determination result in Step S9 is output in this embodiment, the determination in Step S9 may be made by JavaScript or the like, and the application of CSS on the basis of the determination result and a request for the composite image for displaying the second page may be continuously implemented by JavaScript or the like.

The page information transmission unit 13 of the image providing device 1 outputs the CSS2 to the client terminal 3 (S11). When the request for CSS2 contains information indicating a request for the second composite image, the CSS2 contains information indicating use of the image A contained in the first composite image and the images D and E contained in the second composite image for displaying the second page. Because the first composite image used herein is accumulated in the data accumulation unit 34, a request for the first composite image is not made in the subsequent step. On the other hand, when the request for CSS2 contains information indicating a request for the third composite image, the CSS2 contains information indicating use of the images A, D and E contained in the third composite image for displaying the second page (see FIG. 6).

Then, the image data request unit 36 of the client terminal 3 makes a request for the second or third composite image for displaying the second page to the image providing device 1 (S12). When the image request acquisition unit 14 of the image providing device 1 acquires the request for the second or third composite image, the image output unit 17 outputs the second or third composite image that is extracted from the image storage unit 15 by the image extraction unit 16 to the client terminal 3 (S13). By the above process, the second page can be displayed on the client terminal 3.

Figure 8:
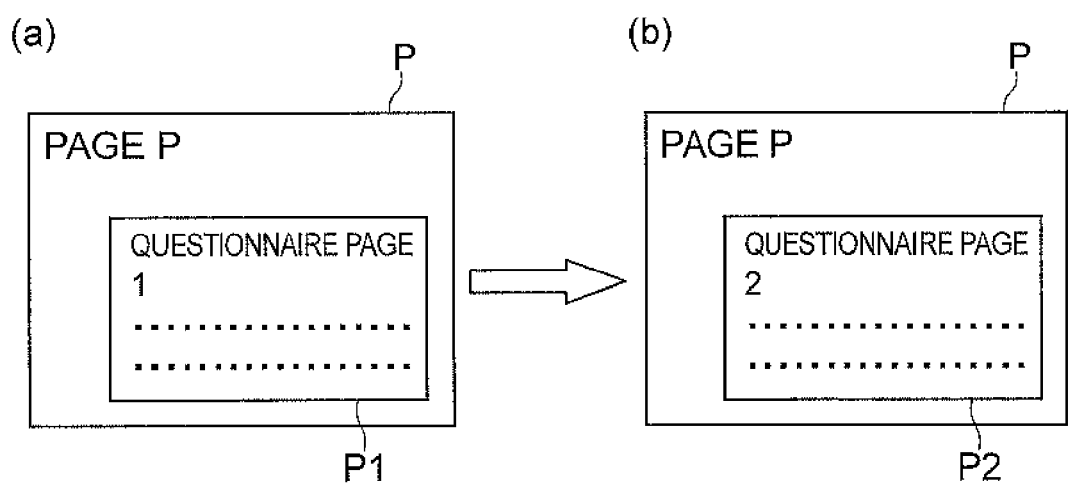
FIG. 8 is a diagram schematically showing an example of control of page transition for implementing an image providing process according to the embodiment.

A specific example of the determination in the request image determination unit 35 is described hereinafter. In the control of page transition in a typical browser, there is the case where it cannot be determined whether data used for displaying the first page is cached or not after page transition from the state where the first page is displayed to the state where the second page is displayed is completed. In such a case, the determination can be made by performing the control of a display page as shown in FIG. 8. Specifically, in the web page shown in FIG. 8(*a*), a first page P1 that is a questionnaire page 1 is displayed in a part of the page P. An example of the web page that is displayed after the above display state is shown in FIG. 8(*b*). In FIG. 8(*b*), the page P remains displayed, and a second page P2 that is a questionnaire page 2 is displayed in a part of the page P. In this manner, by not making transition of the page P in the display of a web page by a browser, it can be determined whether data used for displaying the first page is cached or not at the time of displaying the second page. In other words, in the page P, data displayed in the first page is cached using JavaScript or the like, for example, and the cached data can be displayed when displaying the second page. The control as described with reference to FIG. 8 can be implemented by HTML description such as a frame or iframe tag, for example. Further, the determination as to whether data used for displaying the first page is cached or not after the transition from the first page P1 to the second page P2 may be made using techniques such as FLEX and AJAX related to the display of a web page.

Further, it is possible to determine whether data used for displaying the first page is cached or not at the time of displaying the second page by a technique that allows a browser to have a storage means (local storage) such as HTML5, for example. In this technique, data used for displaying the first page is stored in the local storage by JavaScript, and images can be acquired from the local storage and displayed at the time of displaying the second page. Specifically, even when the page transition occurs, by setting information indicating images acquired when displaying the first page to the local storage in the browser, it is possible to refer to the information when displaying the second page.

According to the image providing device 1 and the image providing method of the first embodiment described above, the first page to be displayed on the client terminal 3 and images contained in the first page are output to the client terminal 3, and then second page information containing the determination instruction information is transmitted to the client terminal 3 for displaying the second page. Based on the determination instruction information, it is determined whether images contained in the first page are accumulated in the client terminal 3. When a request for the second composite image is received from the client terminal 3 based on the determination, it can be determined that images contained in the first page are accumulated. The second composite image is thereby output to the client terminal 3, and therefore it is appropriately avoided that an image contained in common in the first page and the second page is redundantly output to the client terminal 3. On the other hand, when a request for the third composite image is received from the client terminal 3 based on the determination in the client terminal 3, it can be determined that images contained in the first page are not accumulated. The third composite image that includes an image contained in common in the first page and the second page is thereby output to the client terminal 3, and therefore the second page can be reliably displayed on the client terminal 3.

Second Embodiment

A second embodiment of an image providing device according to the present invention is described hereinafter with reference to FIGS. 9 to 12. Note that, in FIGS. 9 to 12, the same or equivalent elements as those of the first embodiment are denoted by the same reference symbols, and the redundant explanation thereof is omitted.

In the first embodiment, the client terminal 3 determines whether images contained in the first page (first composite image) are accumulated in the data accumulation unit 34, and the image providing device 1 receives a request for the second or third composite image on the basis of the determination result and thereby recognizes whether images contained in the first page are accumulated in the client terminal 3 in such a manner that they can be re-displayed. On the other hand, in the second embodiment, when images contained in the first page are not accumulated in the client terminal in such a manner that they can be re-displayed, a request for images contained in the first page is made to the image providing device, so that the image providing device 1 can recognize whether images contained in the first page are accumulated in the client terminal 3 in such a manner that it can be re-displayed.

Figure 9:
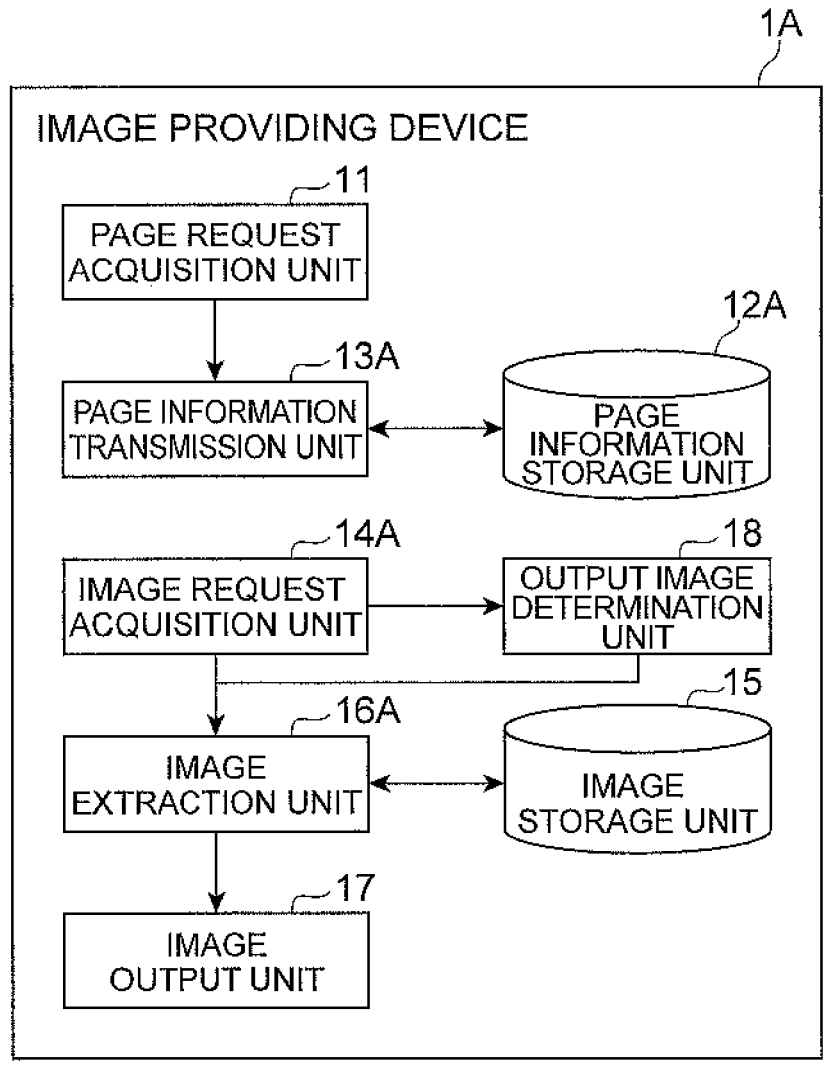
FIG. 9 is a block diagram showing a functional configuration of an image providing device according to a second embodiment.

FIG. 9 is a block diagram showing a functional configuration of an image providing device 1A according to the second embodiment. As shown in FIG. 9, the image providing device 1A is different from the image providing device 1 according to the first embodiment in that it further includes an output image determination unit 18. Further, the image providing device 1A includes a page information storage unit 12A, a page information transmission unit 13A (first page information output means, second page information output means), an image request acquisition unit 14A (determination means), and an image extraction unit 16A (image output means), which have different functions from the page information storage unit 12, the page information transmission unit 13, the image request acquisition unit 14 and the image extraction unit 16, respectively, included in the image providing device 1.

Figure 10:
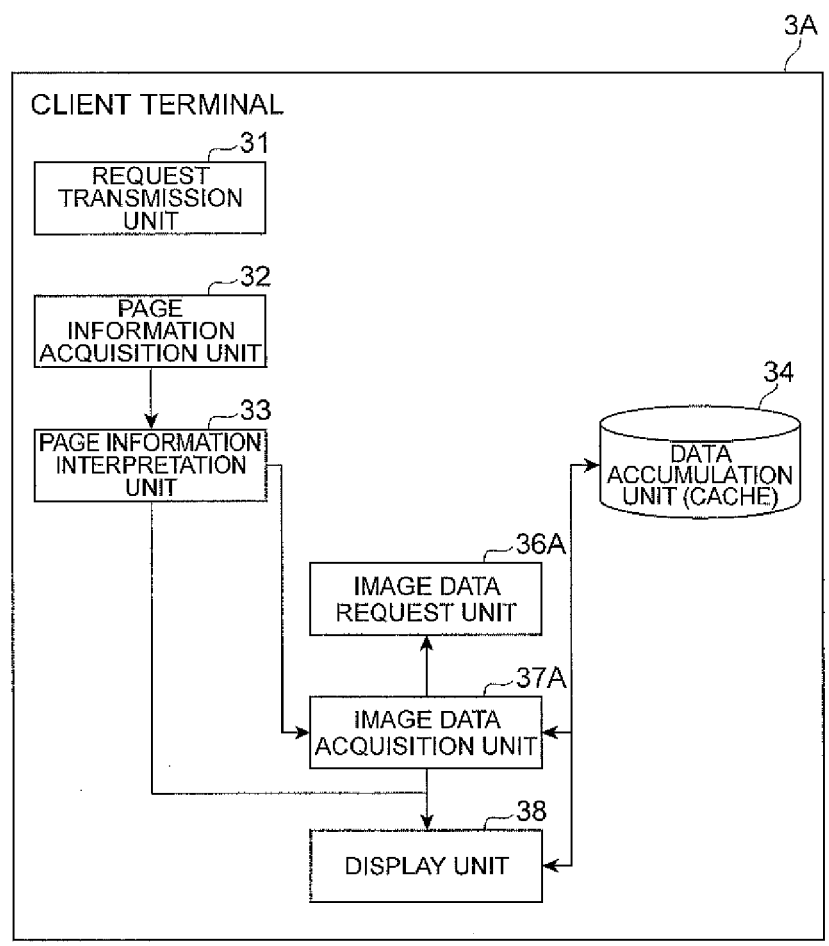
FIG. 10 is a block diagram showing a functional configuration of a client terminal according to the second embodiment.

Further, FIG. 10 is a block diagram showing a functional configuration of a client terminal 3A according to the second embodiment. The client terminal 3A is different from the client terminal 3 according to the first embodiment in that it does not include the request image determination unit 35. Further, the client terminal 3A includes an image data request unit 36A and an image data acquisition unit 37A, which have different functions from the image data request unit 36 and the image data acquisition unit 37, respectively, included in the client terminal 3. Differences of the functions of the image providing device 1A and the client terminal 3A from those in the first embodiment are described hereinafter with reference to FIGS. 9 and 10.

Figure 11:
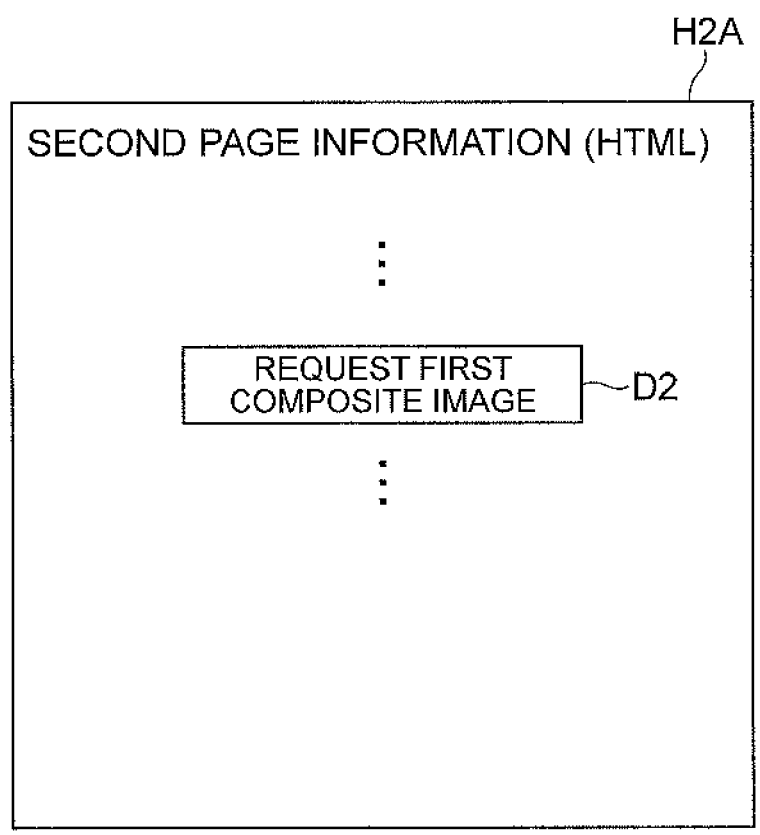
FIG. 11 is a diagram schematically showing second page information according to the second embodiment.

The page information storage unit 12A stores page information, and it stores second page information H2A as shown as an example in FIG. 11 as information for displaying the second page. The second page information H2A is represented by HTML, for example. As shown in FIG. 11, the second page information H2A contains request instruction information D2. The request instruction information D2 causes the client terminal 3A to make a request for a first composite image, which includes images contained in the first page, to the image providing device 1A.

The page information transmission unit 13A outputs the second page information H2A to the client terminal 3A in response to a request from the client terminal 3A in order to display the second page on the client terminal 3A after displaying the first page.

The image request acquisition unit 14A receives a request for the first composite image based on interpretation and execution of the second page information H2A in the client terminal 3A. To be specific, the image request acquisition unit 14A receives a request for information to identify whether the first composite image is accumulated in such a manner that it can be re-displayed.

The output image determination unit 18 is a part that determines whether images contained in the first page are accumulated in the client terminal in such a manner that they can be re-displayed. To be specific, when the image request acquisition unit 14A receives a request for the first composite image, the output image determination unit 18 analyzes the request from the client terminal 3A that contains information capable of identifying whether images are accumulated in such a manner that they can be re-displayed. This enables the determination in the output image determination unit 18 described above.

The image extraction unit 16A extracts the second composite image or the third composite image from the image storage unit 15 in accordance with the determination result in the output image determination unit 18. Specifically, when the output image determination unit 18 determines that the first composite image is accumulated in the client terminal 3A in such a manner that it can be re-displayed, the image extraction unit 16A extracts the second composite image from the image storage unit 15. On the other hand, when the output image determination unit 18 determines that the first composite image is not accumulated in the client terminal 3A in such a manner that it can be re-displayed, the image extraction unit 16A extracts the third composite image from the image storage unit 15. Then, the image output unit 17 outputs the second or third composite image extracted by the image extraction unit 16A to the client terminal 3A.

In the client terminal 3A, when the page information acquisition unit 32 receives the second page information H2A, the image data request unit 36A transmits a request for the first composite image to the image providing device 1A based on the interpretation of the request instruction information D2 by the page information interpretation unit 33.

The image data acquisition unit 37A determines whether the first composite image is accumulated in the data accumulation unit 34 or not and, when the image data is not accumulated in the data accumulation unit, it sends out a request for acquiring the image data to the image data request unit 36A.

The image data request unit 36A outputs a request for the first composite image to the image providing device 1A only when it acquires the determination result that the first composite image is not accumulated in the data accumulation unit 34 from the image data acquisition unit 37A.

Figure 12:
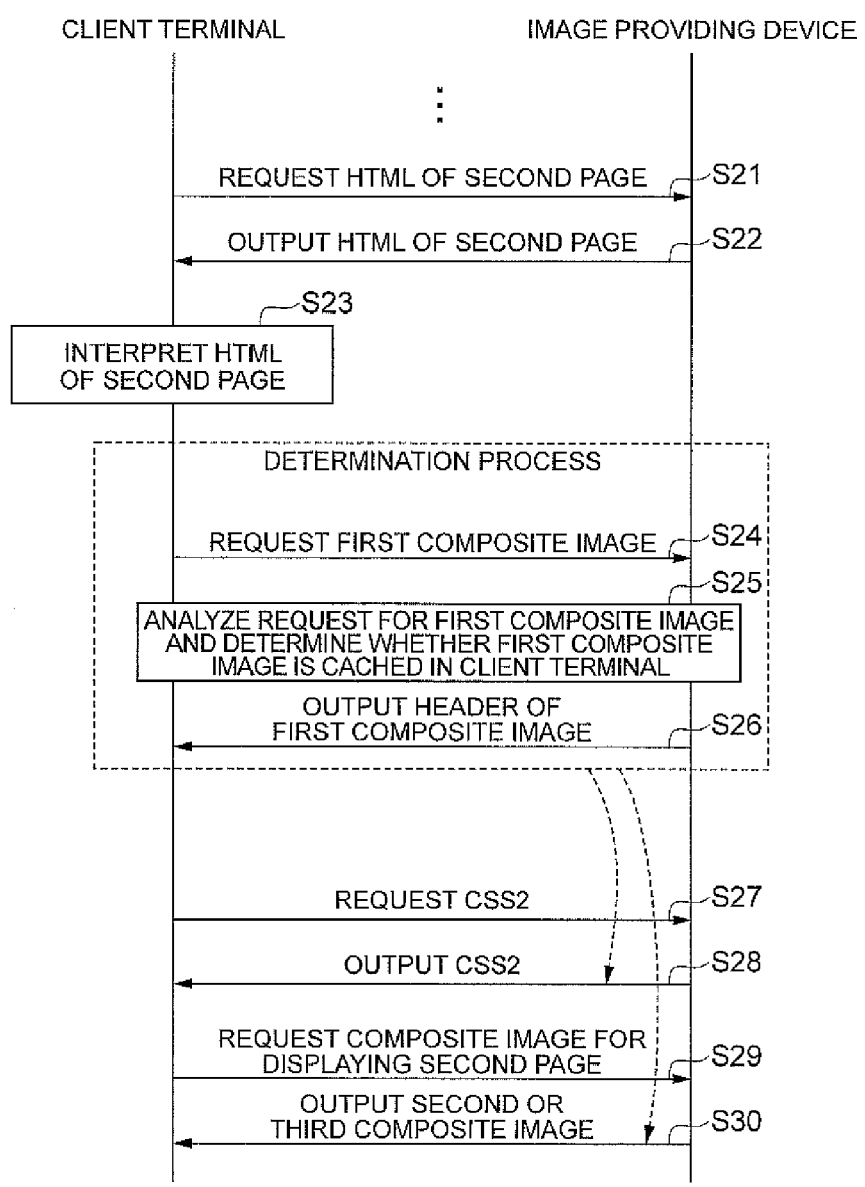
FIG. 12 is a timing chart showing a process in the image providing device according to the second embodiment.

The operation of the image providing device 1A according to the second embodiment is described hereinafter with reference to FIG. 12. FIG. 12 is a timing chart showing an image providing process for the client terminal 3A in the image providing device 1A. The timing chart shown in FIG. 12 shows the process that is performed after Steps S1 to S6 in the timing chart shown in FIG. 7.

In Step S21, the request transmission unit 31 of the client terminal 3A makes a request for HTML (second page information) for displaying the second page to the image providing device 1A (S21). When the page request acquisition unit 11 of the image providing device 1A acquires the request for the second page information H2A, the page information transmission unit 13A outputs the second page information H2A to the client terminal 3A (S22). Then, the page information interpretation unit 33 of the client terminal 3A interprets the second page information H2A, and the following determination process is performed based on the interpretation.

In the determination process, the image data request unit 36A transmits a request for the first composite image to the image providing device 1A based on the interpretation of the request instruction information D2 by the page information interpretation unit 33 (S24). When the request for the first composite image is received, the output image determination unit 18 of the image providing device 1A analyzes information contained in the request and determines whether the first composite image is accumulated in the client terminal 3A in such a manner that it can be re-displayed (S25). The request for the first composite image contains information capable of identifying whether the first composite image is accumulated in such a manner that it can be re-displayed. Further, when the request for the first composite image is received by the image request acquisition unit 14A, header information of the first composite image is sent to the client terminal 3A (S26).

The request transmission unit 31 of the client terminal 3A outputs a request for CSS2, which is CSS information for displaying the second page, to the image providing device 1A (S27). In response to the request, the page information transmission unit 13A of the image providing device 1 outputs the CSS2 to the client terminal 3 (S28). In the determination in Step S25, when it is determined that the first composite image is accumulated in the client terminal 3A in such a manner that it can be re-displayed, the CSS2 contains information indicating use of the image A contained in the first composite image and the images D and E contained in the second composite image for displaying the second page. Because the first composite image used herein is accumulated in the data accumulation unit 34, a request for the first composite image is not made in the subsequent step. On the other hand, when it is determined that the first composite image is not accumulated in the client terminal 3A in such a manner that it can be re-displayed, the CSS2 contains information indicating use of the images A, D and E contained in the third composite image for displaying the second page (see FIG. 6).

Then, the image data request unit 36A of the client terminal 3A makes a request for the second or third composite image for displaying the second page to the image providing device 1 (S29). When the image request acquisition unit 14A of the image providing device 1 acquires the request for the second or third composite image, the image output unit 17 outputs the second or third composite image that is extracted from the image storage unit 15 by the image extraction unit 16A to the client terminal 3A (S30). By the above process, the second page can be displayed on the client terminal 3A.

According to the image providing device 1A and the image providing method of the second embodiment described above, the second page information containing the request instruction information is transmitted to the client terminal 3A. Based on the request instruction information, when the first composite image is not accumulated in the client terminal 3A, the client terminal 3A makes a request for the first composite image to the image providing device 1A. When the image providing device 1A does not receive a request for the first composite image from the client terminal 3A, it can be determined that the first composite image is accumulated in the client terminal 3A. The second composite image is thereby output to the client terminal 3A, and therefore it is appropriately avoided that an image A contained in common in the first page and the second page is redundantly output to the client terminal 3A. On the other hand, when the image providing device 1A receives a request for the first composite image from the client terminal 3A, it can be determined that the first composite image is not accumulated in the client terminal 3A. The third composite image that contains the image A contained in common in the first page and the second page is thereby output to the client terminal 3A, and therefore the second page can be reliably displayed on the client terminal 3A.

Alternative Example of Second Embodiment

Note that, although the image providing device 1A determines whether the first composite image is accumulated in the client terminal 3A in such a manner that it can be re-displayed based on the information contained in a request for the first composite image from the client terminal 3A in the second embodiment, the determination may be made by the following method.

Specifically, in the client terminal 3A, when the page information acquisition unit 32 receives the second page information H2A, the image data request unit 36A transmits a request for the first composite image to the image providing device 1A based on interpretation of the request instruction information D2 by the page information interpretation unit 33.

In response thereto, the image request acquisition unit 14A acquires the request for the first composite image based on interpretation and execution of the second page information H2A in the client terminal 3A. Acquiring the request, the output image determination unit 18 outputs header information of the first composite image to the client terminal 3A.

Then, the image data acquisition unit 37A of the client terminal 3A acquires the header information of the first composite image transmitted from the image providing device 1A. The image data acquisition unit 37A then determines whether the first composite image is accumulated in the data accumulation unit 34 based on the header information and sends out the determination result to the image data request unit 36A. Only when the image data request unit 36A acquires the determination result that the first composite image is not accumulated in the data accumulation unit 34 from the image data acquisition unit 37A, it outputs a request for the body of the first composite image to the image providing device 1A.

Then, when the request for the body of the first composite image is not received from the client terminal 3A within a specified period of time from the time when the header information of the first composite image is transmitted from the image providing device 1 to the client terminal 3A, the output image determination unit 18 determines that the first composite image is accumulated in the client terminal 3A in such a manner that it can be re-displayed. On the other hand, when the request for the body of the first composite image is received from the client terminal 3A within a specified period of time from the time when the header information of the first composite image is transmitted from the image providing device 1 to the client terminal 3A, the output image determination unit 18 determines that the first composite image is not accumulated in the client terminal 3A in such a manner that it can be re-displayed.

(Image Providing Program)

Figure 13:
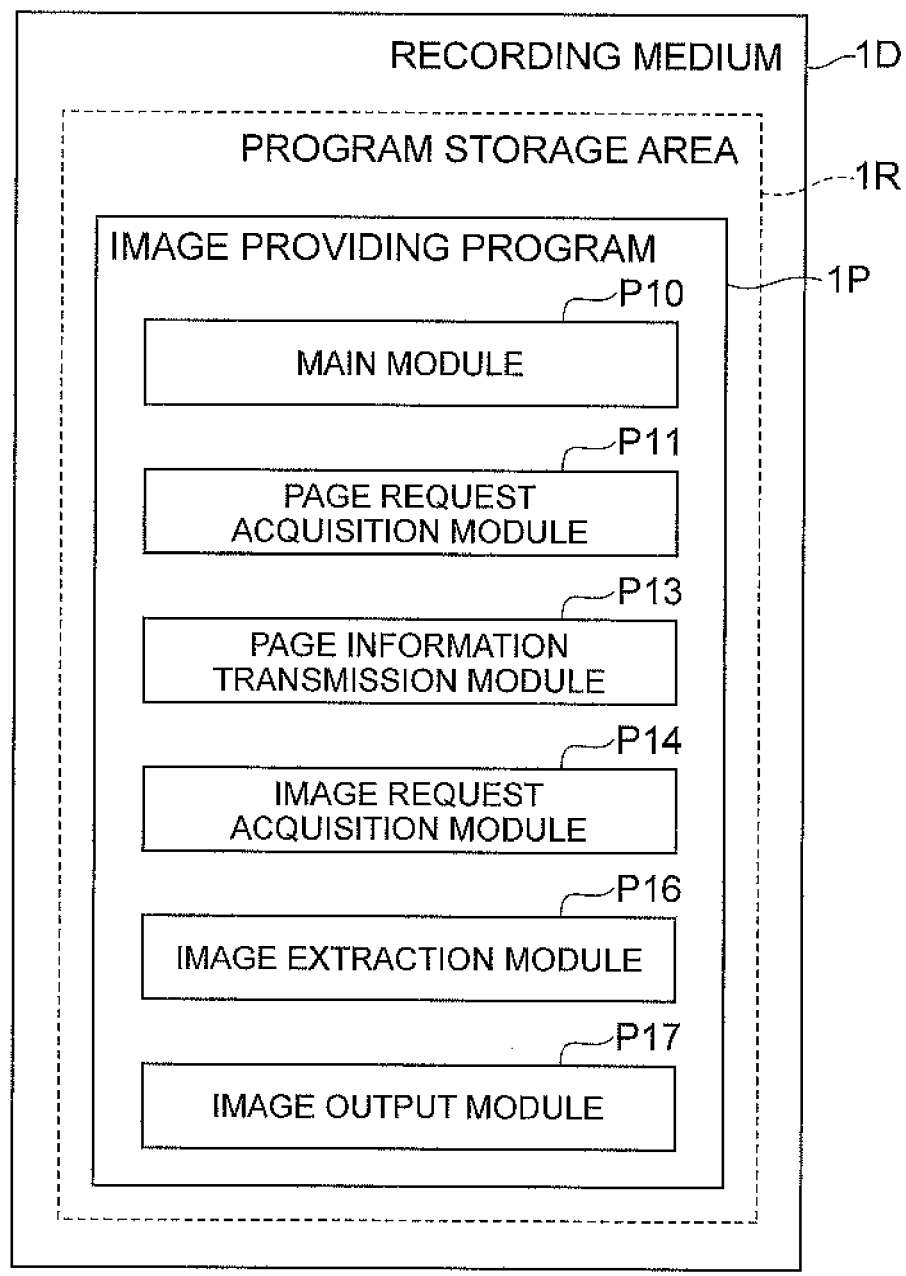
FIG. 13 is a diagram showing a configuration of an image providing program.

An image providing program that causes a computer to function as the image providing device 1 is described hereinafter with reference to FIG. 13. FIG. 13 is a diagram showing an image providing program 1P that corresponds to the image providing device 1 according to the first embodiment shown in FIG. 2.

The image providing program 1P includes a main module P10, a page request acquisition module P11, a page information storage module P12, a page information transmission module P13, an image request acquisition module P14, and an image extraction module P16.

The main module P10 is a part that exercises control over the image providing device 1. The functions implemented by executing the page request acquisition module P11, the page information storage module P12, the page information transmission module P13, the image request acquisition module P14 and the image extraction module P16 are equal to the functions of the page request acquisition unit 11, the page information storage unit 12, the page information transmission unit 13, the image request acquisition unit 14 (determination means), the image storage unit 15 and the image extraction unit 16 shown in FIG. 2, respectively.

The image providing program 1P is provided through a storage medium 1D such as CD-ROM or DVD-ROM or a semiconductor memory, for example. Further, the image providing program 1P may be provided as a computer data signal superimposed onto a carrier wave over a communication network.

Note that the image providing program 1P shown in FIG. 13 is a program corresponding to the image providing device 1 according to the first embodiment, and an image providing program corresponding to the image providing device 1A according to the second embodiment further includes an output image determination module that implements the function of the output image determination unit 18 in addition to the modules shown in FIG. 13.

The embodiments of the present invention are described in detail above. However, the present invention is not restricted to the above-described embodiments, and various changes and modifications may be made without departing from the scope of the invention.

INDUSTRIAL APPLICABILITY

According to the embodiments, it is possible to reduce the total size of transferred images as well as reducing the number of transfers of images in a technique of displaying images on a web page by transfer and display of a composite image such as CSS sprites, for example.

REFERENCE SIGNS LIST

1,1A . . . image providing device, 3,3A . . . client terminal, 11 . . . page request acquisition unit, 12,12A . . . page information storage unit, 13,13A . . . page information transmission unit, 14,14A . . . image request acquisition unit, 15 . . . image storage unit, 16,16A . . . image extraction unit, 17 . . . image output unit, 18 . . . output image determination unit, 31 . . . request transmission unit, 32 . . . page information acquisition unit, 33 . . . page information interpretation unit, 34 . . . data accumulation unit, 35 . . . request image determination unit, 36,36A . . . image data request unit, 37,37A . . . image data acquisition unit, 38 . . . display unit, D1 . . . determination instruction information, D2 . . . request instruction information, H2,H2A . . . second page information, 1D . . . storage medium, 1P . . . image providing program, P10 . . . main module, P11 . . . page request acquisition module, P12 . . . page information storage module, P13 . . . page information transmission module, P14 . . . image request acquisition module, P16 . . . image extraction module

The invention claimed is:

1. An image providing device that provides images contained in a page to a client terminal, comprising:
a first page information output unit configured to output first page information for displaying a first page containing at least one first image and the at least one first image contained in the first page to the client terminal;
an image output unit configured to output a second composite image combining one or more images, other than the at least one first image contained in the first page, of a plurality of images contained in a second page to be displayed after the first page is displayed on the client terminal to the client terminal; and
a second page information output unit configured to output second page information containing display instruction information to display a second image contained in the second page and contained in common in the first page based on the at least one first image output by the first page information output unit;
a determination unit configured to determine whether the at least one first image contained in the first page is stored in the client terminal in such a manner that it can be re-displayed based on a condition of a request from the client terminal,
wherein the second page information output unit is further configured to display a third image contained in the second page other than the at least one first image contained in the first page based on the second composite image output by the image output unit, and
wherein the image output unit outputs the second composite image to the client terminal when the determination unit determines that the at least one first image contained in the first page is stored in the client terminal in such a manner that it can be re-displayed, and outputs a third composite image combining the plurality of images contained in the second page, including an image contained both in the first page and the second page, to the client terminal when the determination unit determines that the at least one first image contained in the first page is not stored in the client terminal in such a manner that it can be re-displayed.

2. The image providing device according to claim 1, wherein
the first page contains a plurality of images, and
the first page information output unit outputs a first composite image combining the plurality of images contained in the first page to the client terminal.

3. The image providing device according to claim 1, wherein
the second page information output unit outputs the second page information containing information to display the second page on the client terminal, the second page information containing determination instruction information causing the client terminal to determine whether the image contained in the first page is stored in the client terminal, and
the determination unit determines that the at least one first image contained in the first page is stored in the client terminal in such a manner that it can be re-displayed when a request for the second composite image based on determination in the client terminal in accordance with the determination instruction information is received, and determines that the at least one first image contained in the first page is not stored in the client terminal in such a manner that it can be re-displayed when a request for the third composite image is received.

4. The image providing device according to claim 1, wherein
the second page information output unit outputs the second page information containing request instruction information causing the client terminal to make a request containing determination information capable of identifying whether the at least one first image contained in the first page is stored in the client terminal in such a manner that it can be re-displayed to the client terminal, and
the determination unit determines whether the at least one first image contained in the first page is stored in the client terminal in such a manner that it can be re-displayed based on the determination information contained in the request received from the client terminal in response to the request instruction information.

5. The image providing device according to claim 1, wherein
the second page information output unit outputs the second page information containing request instruction information causing the client terminal to make a request for the at least one first image contained in the first page to the image providing device when the at least one first image contained in the first page is not stored in the client terminal in such a manner that it can be re-displayed to the client terminal, and
the determination unit determines that the at least one first image contained in the first page is stored in the client terminal in such a manner that it can be re-displayed when the request for the at least one first image contained in the first page from the client terminal based on the request instruction information is not received, and determines that the at least one first image contained in the first page is not stored in the client terminal in such a manner that it can be re-displayed when the request for the at least one first image contained in the first page from the client terminal based on the request instruction information is received.

6. The image providing device according to claim 5, wherein
the determination unit transmits header information containing information for identifying the at least one first image contained in the first page in response to the request for the first page from the client terminal based on the request instruction information, and determines whether the at least one first image contained in the first page is stored in the client terminal in such a manner that it can be re-displayed depending on whether a request for transmission of the at least one first image contained in the first page is received within a specified period of time from when the header information is transmitted.

7. An image providing method in an image providing device that provides images contained in a page to a client terminal, comprising:
a first page information output step of outputting a first page containing at least one first image and the at least one first image contained in the first page to the client terminal;
an image output step of outputting a second composite image combining one or more images, other than the at least one first image contained in the first page, of a plurality of images contained in a second page to be displayed after the first page is displayed on the client terminal to the client terminal; and
a second page information output step of outputting second page information containing display instruction information to display a second image contained in the second page and contained in common in the first page based on the at least one first image output in the first page information output step; and
a determination step of determining whether the at least one first image contained in the first page is stored in the client terminal in such a manner that it can be re-displayed based on determination information contained in a request received from the client terminal in response to request instruction information,
wherein the second page information output step displays a third image contained in the second page other than the at least one first image contained in the first page based on the second composite image output in the image output step, and
wherein the image output step outputs the second composite image to the client terminal when the determination step determines that the at least one first image contained in the first page is stored in the client terminal in such a manner that it can be re-displayed, and outputs a third composite image combining the plurality of images contained in the second page to the client terminal when the determination step determines that the at least one first image contained in the first page is not stored in the client terminal in such a manner that it can be re-displayed.

8. The image providing method according to claim 7, wherein
the second page information output step outputs the second page information containing information to display the second page on the client terminal, the second page information containing the determination instruction information causing the client terminal to determine whether the at least one first image contained in the first page is stored in the client terminal,
the determination step further includes determining that the at least one first image contained in the first page is stored in the client terminal in such a manner that it can be re-displayed when a request for the second composite image based on a determination in the client terminal in accordance with the determination instruction information is received, and determining that the at least one first image contained in the first page is not stored in the client terminal in such a manner that it can be re-displayed when a request for a third composite image combining the plurality of images contained in the second page is received.

9. The image providing method according to claim 7, wherein the second page information output step outputs the second page information containing the request instruction information causing the client terminal to make the request containing the determination information capable of identifying whether the at least one first image contained in the first page is stored in the client terminal in such a manner that it can be re-displayed to the client terminal.

10. The image providing method according to claim 7, wherein the second page information output step outputs the second page information containing the request instruction information causing the client terminal to make the request for the at least one first image contained in the first page to the image providing device to the client terminal, the determination step further includes determining that the at least one first image contained in the first page is stored in the client terminal in such a manner that it can be re-displayed when the request for the at least one first image contained in the first page from the client terminal based on the request instruction information is not received, and determining that the at least one first image contained in the first page is not stored in the client terminal in such a manner that it can be re-displayed when the request for the at least one first image contained in the first page from the client terminal based on the request instruction information is received.

11. A non-transitory computer-readable recording medium storing an image providing program causing a computer to function as an image providing device that provides images contained in a page to a client terminal, the image providing program causing the computer to implement:

a first page information output function of outputting a first page containing at least one first image and the at least one first image contained in the first page to the client terminal;

an image output function of outputting a second composite image combining one or more images, other than the at least one first image contained in the first page, of a plurality of images contained in a second page to be displayed after the first page is displayed on the client terminal to the client terminal; and a second page information output function of outputting second page information containing display instruction information to display a second image contained in the second page and contained in common in the first page based on the at least one first image output by the first page information output function; and a determination function of determining whether the at least one first image contained in the first page is stored in the client terminal in such a manner that it can be re-displayed based on a condition of a request from the client terminal, wherein the second page information output function displays a third image contained in the second page other than the at least one first image contained in the first page based on the second composite image output by the image output function, and wherein the image output function outputs the second composite image to the client terminal when the determination unit determines that the at least one first image contained in the first page is stored in the client terminal in such a manner that it can be re-displayed, and outputs a third composite image combining the plurality of images contained in the second page, including an image contained both in the first page and the second page, to the client terminal when the determination unit determines that the at least one first image contained in the first page is not stored in the client terminal in such a manner that it can be re-displayed.

* * * * *